(12) United States Patent
Krug et al.

(10) Patent No.: US 10,556,551 B2
(45) Date of Patent: Feb. 11, 2020

(54) CARRIER DEVICE FOR ATTACHMENT TO A PANE OF A MOTOR VEHICLE AND MOTOR VEHICLE

(71) Applicant: Daimler AG, Stuttgart (DE)

(72) Inventors: Martin Krug, Karlsruhe (DE); Ulf Ritschel, Bad Liebenzell (DE); Axel Schmidt, Filderstadt (DE)

(73) Assignee: Daimler AG, Stuttgart (DE)

(*) Notice: Subject to any disclaimer, the term of this patent is extended or adjusted under 35 U.S.C. 154(b) by 200 days.

(21) Appl. No.: 15/503,273

(22) PCT Filed: Jul. 31, 2015

(86) PCT No.: PCT/EP2015/001583
§ 371 (c)(1),
(2) Date: Feb. 10, 2017

(87) PCT Pub. No.: WO2016/023621
PCT Pub. Date: Feb. 18, 2016

(65) Prior Publication Data
US 2017/0240120 A1    Aug. 24, 2017

(30) Foreign Application Priority Data
Aug. 12, 2014 (DE) .......................... 10 2014 012 001

(51) Int. Cl.
*B60R 11/04* (2006.01)
*F16M 13/02* (2006.01)
(Continued)

(52) U.S. Cl.
CPC ............. *B60R 11/04* (2013.01); *F16M 13/02* (2013.01); *H04N 5/2252* (2013.01); *B60R 2011/0026* (2013.01)

(58) Field of Classification Search
CPC .............................. H04N 5/2257; B60R 11/04
See application file for complete search history.

(56) References Cited

U.S. PATENT DOCUMENTS

| | | | |
|---|---|---|---|
| 2010/0065707 A1* | 3/2010 | Hansel | B60R 11/04 248/298.1 |
| 2015/0109447 A1* | 4/2015 | Okuda | B60R 11/04 348/148 |

FOREIGN PATENT DOCUMENTS

| | | |
|---|---|---|
| DE | 10 2008 050 320 A1 | 4/2010 |
| DE | 10 2011 121 003 A1 | 6/2013 |

(Continued)

OTHER PUBLICATIONS

Japanese Office Action issued in Japanese counterpart application No. 2017-506967 dated Feb. 13, 2018, with partial English translation (Five (5) pages).

(Continued)

*Primary Examiner* — Minh Q Phan
(74) *Attorney, Agent, or Firm* — Crowell & Moring LLP

(57) ABSTRACT

A carrier device for attachment to a pane of a motor vehicle is disclosed. The carrier device has a base plate which is able to be secured to the pane, on which base plate a carrier arrangement is formed to hold a housing of at least one camera. The carrier arrangement includes at least one holding element having at least one spring element which is designed to apply pressure to a rod-shaped component which is arranged on the housing of the camera and which protrudes beyond a wall of the housing, the pressure acting in the direction towards the second side of the base plate. A pane of a motor vehicle on which such a carrier device is placed is also disclosed.

9 Claims, 13 Drawing Sheets

(51) Int. Cl.
*H04N 5/225* (2006.01)
*B60R 11/00* (2006.01)

(56) References Cited

FOREIGN PATENT DOCUMENTS

| | | |
|---|---|---|
| DE | 10 2012 101 781 A1 | 9/2013 |
| DE | 10 2013 001 547 A1 | 7/2014 |
| DE | 10 2013 005 801 A1 | 10/2014 |
| JP | 2009-545760 A | 12/2009 |
| JP | 2012-144 A | 1/2012 |
| JP | 2015-508728 A | 3/2015 |
| WO | WO 2008/014870 A1 | 2/2008 |

OTHER PUBLICATIONS

PCT/EP2015/001583, International Search Report dated Dec. 1, 2015 (Two (2) pages).

\* cited by examiner

CARRIER DEVICE FOR ATTACHMENT TO A PANE OF A MOTOR VEHICLE AND MOTOR VEHICLE

BACKGROUND AND SUMMARY OF THE INVENTION

The invention relates to a carrier device for attachment to a pane of a motor vehicle. The carrier device comprises a base plate which can be secured on the pane. A carrier arrangement of the carrier device is formed to hold a housing at least of a camera. The invention furthermore relates to a pane of a motor vehicle to which such a carrier device is attached.

DE 10 2008 050 320 A1 describes a carrier device which is positioned on a windscreen of the motor vehicle. A base plate of the carrier device is secured on the pane for this purpose by means of an adhesive. A carrier arrangement for securing a housing of a camera on the base plate comprises a frame which is formed as one piece with the base plate. Spring elements are provided on the frame in the form of a B-shaped metal bracket, the spring elements pressing the camera housing against an opposite wall of the frame when the camera housing is inserted into the frame. Furthermore, curved leaf springs are provided on the base plate which clamp the camera housing in corresponding holders in a direction facing away from the pane by means of rod-shaped components which protrude from the camera housing.

The mounting of the spring elements on the base plate and on the frame thereof is accompanied by a certain amount of effort. In addition, it can be difficult to achieve a positioning of the camera housing by means of the spring element relative to the base plate and thus also relative to the pane of the motor vehicle, on which the base plate is to be placed, the positioning being required for the alignment of the camera.

DE 10 2011 121 003 A1 shows an alternative carrier device for attachment to a windscreen, in which the above-mentioned B-shaped spring element in the frame of the base plate is replaced by a V-shaped spring element. This carrier device also has the curved leaf springs and associated holders to clamp the housing of a camera in a direction facing away from the windscreen.

DE 10 2012 101 781 A1 and PCT/JP/2013/055631 show carrier devices in which the camera is attached to the carrier device at three points by means of three pins or rod-shaped components located on the camera housing.

The object of the present invention is to create a carrier device of the type described above as well as a pane of a motor vehicle having such a carrier device which enables an improved positioning of the at least one camera relative to the base plate, and thus relative to the pane on which the base plate is to be positioned and secured.

The carrier device according to the invention having a base plate which is able to be secured to a pane of a motor vehicle, on which base plate a carrier arrangement is formed to hold a housing of at least one camera, characterized in that the carrier arrangement comprises at least one holding element having at least one spring element, which is formed to apply pressure directly to a rod-shaped component which is arranged on the housing and protrudes beyond a wall of the housing, the pressure acting in the direction towards the base plate. In other words, with respect to a positioning of the carrier device 10 on the pane of a motor vehicle, the housing of the camera is pressed in the direction of the pane by the at least one holding element. Thus, according to the invention, a transparent region to be provided on the pane for the at least one camera can be formed to be comparably small because the size of a cone of vision or detection region of the camera is reduced by each degree of approximation of the camera to the pane: a distance reduced by one millimeter between the camera and the pane results in a diameter reduced by five millimeters for the cone of vision of the camera at the level of the pane through which the at least one camera detects the surroundings.

In the case of a black print to be provided on the pane, which serves for the optical lamination of the carrier device, the required clearance for the cone of vision may be smaller. A cap which covers the camera with respect to the passenger compartment can also be correspondingly sized to be smaller when the camera housing is arranged relatively close to the base plate.

Furthermore, with this type of fastening, no direct forces are introduced into the housing of the camera, but the pressure exerted by the holding elements with the springs acts only on the rod-shaped components protruding beyond the walls of the housing of the camera. The carrier device thus enables an improved positioning of the camera.

The carrier arrangement preferably comprises three holding elements which are arranged on respectively different sides of a receiving region of the carrier device provided for the housing of the camera. Such a fixing of the camera housing on three mounting points which are allocated to a receiving area and provided by the holding elements ensures that the position of the mounted camera housing can be defined particularly well. A movement of the camera housing relative to the base plate, i.e., wobbling, can thus be largely avoided. This is particularly advantageous because, in order to fulfill the tasks to be carried out by the camera, its stable, clear and defined positioning relative to the base plate and thus relative to the pane of the motor vehicle is particularly important.

The receiving region provided for the housing of the camera can, in particular, be substantially rectangular since the housing of the camera can also have a substantially rectangular base area.

Two different receiving regions can be provided on the base plate, wherein three holding elements are respectively allocated to the respective receiving region. In this case, two of the two holding elements may be allocated to the same receiving region. As a result, it is possible to attach either a housing with two cameras, i.e., a so-called stereo camera, or a housing for only one camera, i.e., a so-called mono camera, to the carrier device by means of three respective holding elements. Nevertheless, the carrier device as a whole requires only four holding elements for three holding elements to be allocated to the respective receiving region. One holding element, which is allocated to the receiving region provided for the mono camera when the stereo camera is arranged on the carrier device, remains unused. Likewise, when the mono camera is arranged on the carrier device in the receiving region provided for the mono camera, the holding element which is allocated to the receiving region for the stereo camera remains unused.

By providing the three holding elements per receiving region for the housing of the at least one camera, an angle, which the at least one camera should have with respect to the base plate and thus to the pane, can be reproduced with particularly high accuracy.

Two of the three holding elements can be arranged on sides of the receiving region which run at least substantially in parallel to longitudinal sides of the motor vehicle with respect to a positioning of the carrier device 10 on the pane of the motor vehicle. An orientation of the camera housing relative to the longitudinal direction of the vehicle can be set by securing two rod-shaped components to these two holding elements. If the two holding elements arranged on the sides of the receiving region are arranged in such a way that the rod-shaped components secured to these are aligned with one another, an axis of rotation for the housing results in an advantageous manner. By pivoting the camera housing about this axis of rotation, an angle of the camera housing relative to the base plate can then be adjusted in a particularly simple and secure manner by securing a third rod-shaped component to a third one of the three holding elements.

The two holding elements arranged on the sides of the receiving region each preferably have an insertion region which leads to respective locking recesses for the respective rod-shaped component. A mounting direction for the housing of the at least one camera running at least substantially parallel to the base plate is predetermined by the insertion region. Such a mounting direction is advantageous since it necessary to ensure that pressure applied to the pane when the camera housing is mounted is not excessive. Installation kinematics of the camera housing improved in this way result in greater forces being able to be applied in parallel to the pane during mounting without incurring the risk of damage to the pane. A particularly simple mounting results when the mounting direction coincides with the inclination of the panes when the pane is tilted. For example, the housing can be installed substantially from top to bottom when it is moved in parallel to the base plate.

The locking recesses ensure a positive-locking securing of the rod-shaped components and thus a positive-locking attachment of the camera housing to the carrier device in the event of collision. The locking recesses namely prevent the housing of the at least one camera from moving in the longitudinal direction of the vehicle as soon as the rod-shaped components are received in the locking recesses of the two holding elements.

It has been shown to be a further advantage when the mounting direction points in a forward travel direction of the motor vehicle with respect to a positioning of the carrier device 10 on the pane of the motor vehicle, wherein the insertion regions of the two holding elements are formed to open against the mounting direction in a U shape or V shape. Such a formation of the insertion regions is advantageous, for example, in the event of a frontal collision of the motor vehicle, since the housing of the at least one camera is then held securely in the longitudinal direction of the vehicle, in which the insertion regions taper.

A third of the two holding elements is preferably arranged on a side of the receiving region which is closer to a vehicle front than to a vehicle rear with respect to a positioning of the carrier device 10 on the pane of the motor vehicle. In other words, the third holding element can be provided on a front side of the receiving region. The side of the housing of the at least one camera which is opposite this front side can then be used for the provision of connectors or the like without the rod-shaped component being in the way.

It has been shown to be a further advantage if an indentation or depression is formed in a base region of the third holding element, into which indentation or depression a rod-shaped component projecting in the mounting direction beyond a wall of the housing can be inserted.

The housing of the camera can be mounted in a particularly simple manner by introducing the rod-shaped component into the depression. This is particularly true if the rod-shaped component projecting in the mounting direction beyond the wall of the housing is longer than the two rod-shaped components provided on the sides of the camera housing. Furthermore, in order to facilitate the introduction of the rod-shaped component into the depression, the rod-shaped component can be chamfered or conically tapered.

On the other hand, the rod-shaped components to be received in the two locking recesses are preferably formed to be round and to have a smooth surface in order to ensure as easy an installation as possible of the camera housing.

It has been found to be a further advantage if a height of the third holding element is adjusted depending on an inclination of the pane of the motor vehicle and a detection region of the at least one camera. Thus, by changing the height of the holding element, the otherwise unchanged carrier device can be used very simply in vehicle model ranges which have different pane inclinations. This is then particularly easy, in particular, if the base plate and the base body of the holding elements which is formed as one piece with this are made of a plastic, for example, when producing the carrier device in an injection molding process. In particular, in the case of a tool used for the production of the base plate, only an exchangeable insert needs to be used, by means of which the height of the third holding element can be predetermined. Therefore, the entire tool does not need to be reproduced in order to produce the base plate. In fact, it is sufficient to equip the otherwise unchanged tool with only one exchangeable insert to be provided for the shaping of the third holding element.

In addition or alternatively, spacers arranged on the first side of the base plate can be adjusted in height depending on an inclination of the pane. Here too, when the base plate is produced from a plastic, it is possible to use exchangeable inserts which result in different heights of the spacers depending on the inclination of the pane provided in the vehicle model range. Thus, irrespective of the pane inclination present in the respective vehicle model range, a desired angle can be predefined at which the at least one camera detects the surroundings in relation to the horizontal.

The at least one spring element of the at least one holding element, which serves to apply pressure to the rod-shaped component acting in the direction towards the base plate, is preferably formed from a metal. Metal spring elements are particularly elastic and robust. In particular, simple leaf springs can be used as metallic spring elements, the leaf spring being able to be produced to be pure, small and inexpensive. In addition, such spring elements can be arranged in respective base bodies of the holding elements as early as the production stage of the base plate with particularly low effort. This results in production advantages when equipping the motor vehicle with the carrier device and with the housing for the camera. A mechanical installation of the spring elements can be carried out, for example, via round table robots or other automated techniques.

The spring element advantageously has a securing element which prevents the spring element from being detached from the base body of the holding element. For example, a tab or the like formed in the manner of an undercut can be provided which springs back into its installation position when the spring element is moved and then engages with the base body in the state where the spring element is arranged on the base body of the holding element.

A diaphragm element can be provided on the at least one camera, the diaphragm element being able to be secured to the base plate. Such a diaphragm element, for example in the form of a lens hood, which can be detachably secured to the base plate, allows a desired equipping of the base plate with the respective diaphragm element, depending on the equipping of the carrier device with one or two cameras. The securing of the diaphragm element to the base plate can be carried out, for example, by clipping or similar. By means of the detachable holding of the diaphragm element on the base plate, a diaphragm element which is adapted in shape to the respective camera type can be used.

Furthermore, it is possible to provide different materials and surfaces or also paints for the diaphragm element which may deviate from those of the base plate. The diaphragm element can therefore be adapted particularly well to its respective application purpose and yet can be provided already detachably attached to the base plate.

Such a diaphragm element, which can be secured to the base plate, may have a heating device. As a result, it is possible to apply heat energy to the region of the pane which is to be kept clear of mist in order to ensure that the camera can see through the pane clearly. By integrating the heating device into the diaphragm element, the area of the pane in which a lens of the camera is located can be applied with heat energy in a precise manner. In addition, a heating wire or the like do not need to be provided in the pane when a heating wire or a similar heating means is arranged in the diaphragm element. This reduces the variants of the pane to be provided depending on the equipping of the vehicle with one or two (or no) camera and is therefore particularly advantageous.

In the event of failure of the heating device, the diaphragm element can also be exchanged in a particularly simple manner. A connection of the heating device of the diaphragm element to a vehicle electrical system can also be achieved in a particularly simple manner by connection means for a corresponding distribution device being provided on the base plate, via which distribution device heating wires or the like can be supplied with electrical energy provided by the vehicle electrical system.

Finally, it has been shown to be advantageous if the carrier device comprises at least one cover element which can be broken out of the base plate, by means of which a recess in the base plate provided for a camera or an additional sensor can be closed. If the carrier device is not equipped with the camera or the additional sensor, the cover element can then be left on the base plate to close the recess. This ensures a protection of components arranged on the carrier device and—in the installation position of the carrier device—of the pane from dust.

Furthermore, a carrier device designed principally for holding a housing of a stereo camera can be used to hold the housing of a mono camera, and the recess provided for the second camera remains closed by means of the at least one cover element. A predetermined breaking point is preferably provided for a reliable breaking out of the at least one cover element.

The pane of a motor vehicle according to the invention is equipped with a carrier device according to the invention by gluing in an exact position. By means of an exact positioning of the carrier arrangement of the carrier device on the pane, the housing of the at least one camera can be attached thereto in such a way that, after installation of the pane in the motor vehicle, surroundings of the motor vehicle can be recorded at least in regions by means of the at least one camera. In this case, the carrier arrangement enables a simple and low-cost securing of the housing of the at least one camera on the base plate of the carrier device, namely in an angular position as is provided for detecting at least the region of the surroundings of the motor vehicle. A secure holding of the housing of the at least one camera on the base plate is hereby ensured, wherein relative movements between the housing of the camera and the carrier device are largely prevented. This ensures that a desired alignment of an optical axis of the camera relative to the pane of the motor vehicle is fulfilled in a particularly precise manner. The positioning of the camera on the pane is thus improved by all advantages of the carrier device according to the invention.

The advantages and preferred embodiments described for the carrier device according to the invention also apply to the pane of the motor vehicle according to the invention and vice versa.

The features and feature combinations referred to in the description, as well as the features and feature combinations referred to below in the description of the figures and/or shown solely in the figures can be used not only in each specified combination but also in other combinations or alone without leaving the scope of the invention. Thus, embodiments are also to be considered as being comprised and disclosed by the invention which are not explicitly shown or explained in the figures, but which arise and can be produced by separate feature combinations from the described embodiments.

Further advantages, features and details of the invention arise from the claims, the following description of preferred embodiments, and with the aid of the drawings, in which the same or functionally equivalent elements are provided with identical reference numerals.

DETAILED DESCRIPTION OF THE DRAWINGS

Figure 1:
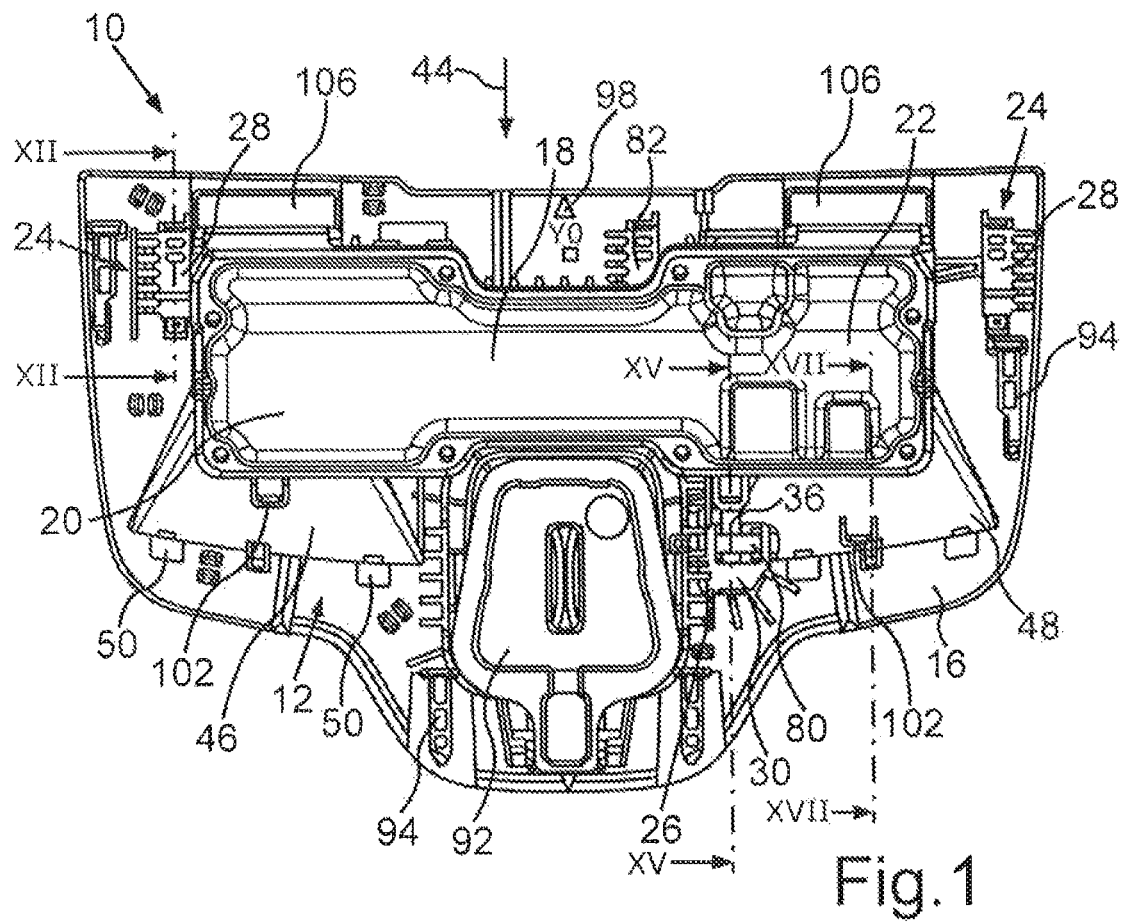
FIG. 1 in a top view, shows a carrier device for attachment to a windscreen of a motor vehicle, wherein a housing having two cameras is held on the carrier device.
Figure 4:
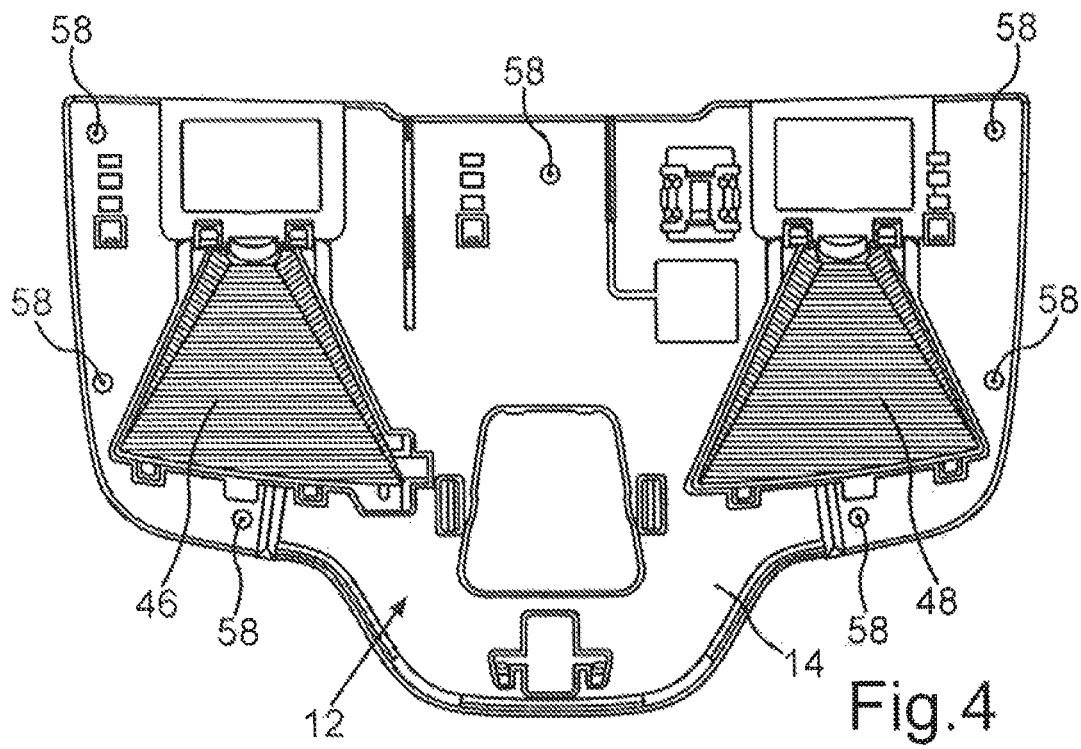
FIG. 4 shows the carrier device according to FIG. 1 in a view of a side of a base plate facing towards the pane of the motor vehicle.

FIG. 1 shows a top view of a carrier device 10 which can be attached to a pane (not shown), such as, for example, a windscreen of a motor vehicle, in order to position a camera on this pane. The carrier device 10 comprises a base plate 12, of which a first side 14 facing towards the pane is shown in FIG. 4. FIG. 1 shows the second side 16 of the base plate 12 facing away from the pane.

A housing 18 is held on the base plate 12, in which housing two cameras are arranged in the variant shown in FIG. 1. A first camera is located, with reference to FIG. 1, in the left region 20 of the housing 18 and a second camera, also with reference to FIG. 1, in the right region 22 of the housing 18. In order to attach the housing 18 to the carrier device 10, holding elements 24, 26 are provided which are arranged on respectively different sides of a receiving region of the carrier device 10 provided for the housing 18. Two holding elements 24 are arranged on sides of the receiving region which run in parallel to longitudinal sides of the motor vehicle in relation to a positioning of the carrier device 10 on the pane of the motor vehicle. These two holding elements 24 each comprise base bodies 28 which are formed identically and in one piece with the base plate 12. In an analogous manner, the third holding element 26, which is arranged on a front side of the receiving region in relation to a positioning of the carrier device 10 on the pane of the motor vehicle, comprises a base body 30 which is formed as one piece with the base plate 12.

Figure 2:
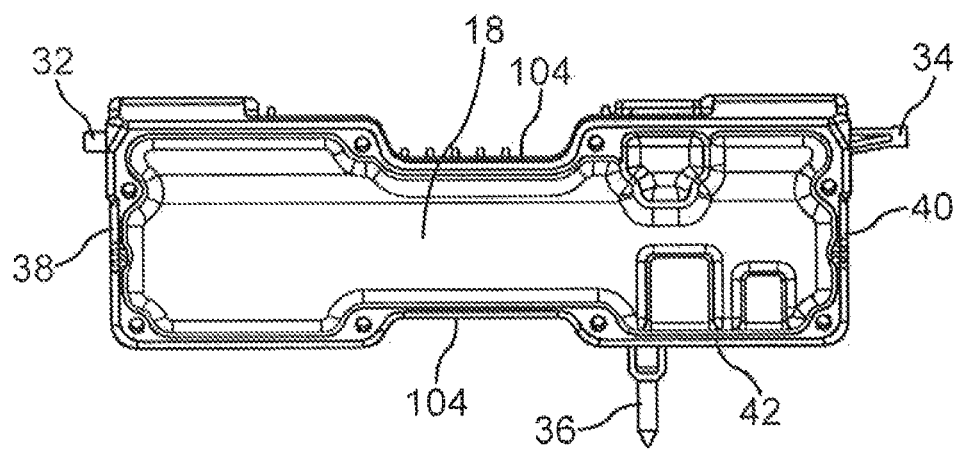
FIG. 2 in a top view, shows the housing of the cameras according to FIG. 1.
Figure 3:
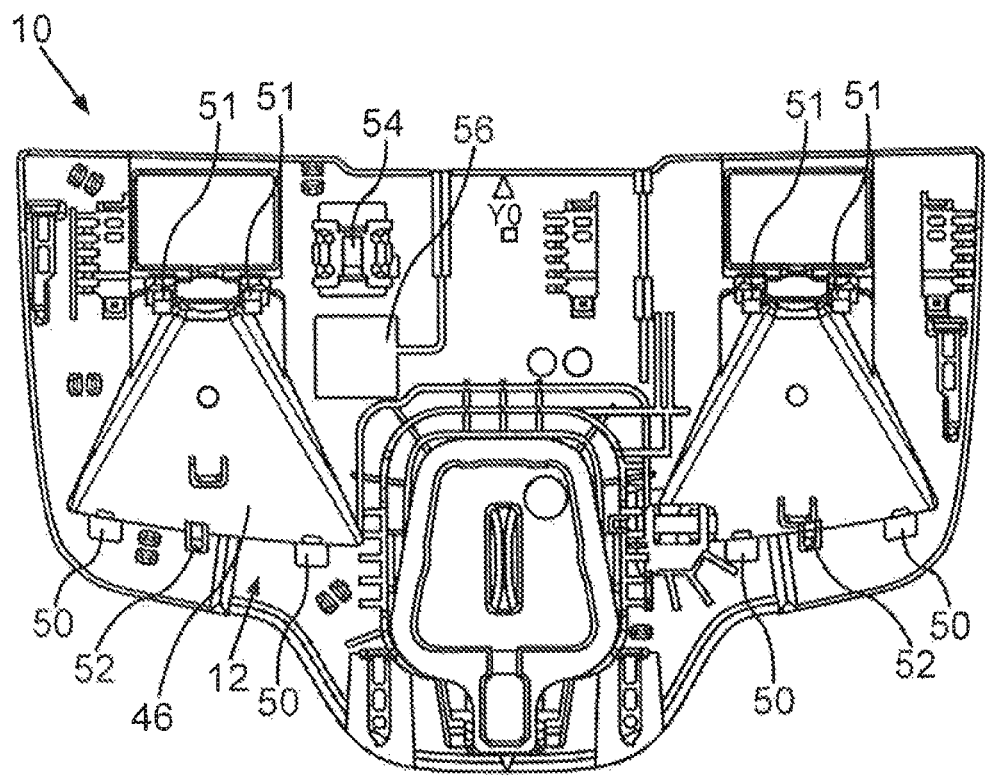
FIG. 3 in a top view, shows the carrier device according to FIG. 1, but without the camera housing.

Respective rod-shaped components in the form of bolts 32, 34, 36 are secured on the holding elements 24, 26, the components protruding beyond respective walls 38, 40, 42 of the housing 18 (see FIG. 2). With respect to a positioning of the carrier device 10 on the pane of the motor vehicle, an arrow 44 shown in FIG. 1 points in a forward travel direction of the motor vehicle. Correspondingly, the first bolt 32 arranged on the left side of the housing 18 as seen in the forward travel direction protrudes beyond the left-hand side wall 38. The second bolt 34 correspondingly protrudes beyond the right-hand side wall 40 and the front-side third bolt 36 protrudes beyond the front-side wall 42.

By securing the three bolts 32, 34, 36 to the corresponding three holding elements 24, 26, the position of the housing 18 and thus of the cameras relative to the base plate 12 and thus to the pane of the motor vehicle can be adjusted particularly well and with high position accuracy. An angle of optical axes of the cameras relative to the pane can thus be defined with particular accuracy and can be reproduced particularly well.

In the case of the carrier device 10 according to FIG. 1, a diaphragm element in the form of a lens hood 46, 48 is allocated to each of the two cameras. The respective lens hoods 46, 48 are preferably attached to the base plate 12 by clipping in or latching by means of holding tabs 50, 51 in cooperation with depressions 52 provided in the base plate 12 (see FIG. 3, FIG. 17, FIG. 30 and FIG. 31).

The lens hoods 46, 48 can be equipped with a heating device, for example in the form of heating wires. In the event of failure of the heating, the lens hoods 46, 48 can thus be replaced in a simple manner. A holder 54 is provided in a region of the carrier device 10 which is partially covered by the left region 20 of the housing 18 in FIG. 1 (see FIG. 3), by means of which holder a distribution device can be secured to the carrier device 10. The distribution device, which is also referred to as a solder distributor, is used to supply the heating wires which are integrated into the lens hoods 46, 48 with electrical energy, which is provided by the vehicle. The solder distributor can be inserted and soldered via a recess 56 in the base plate 12 (see FIG. 3).

In FIG. 4, the lens hoods 46, 48 can be seen from their side facing towards the pane. Furthermore, spacers 58 are shown in FIG. 4 which are arranged on the side 14 of the base plate 12 facing towards the pane. By securing the height of the spacers 58, the different pane inclinations in different vehicle model ranges can be taken into account in such a way that the same carrier device 10 can still be used in the different model ranges. This ensures that the alignment of an optical axis of the respective camera with respect to a horizontal plane and thus the detection region of the camera is the same in the different vehicle model ranges despite the different inclination of the pane of the motor vehicle.

When the carrier device 10 is arranged on the pane, where the base plate 12 runs in parallel to the pane, the spacers 58 can be 1 mm tall, for example. The spacers 58 also ensure that an adhesive which is used to attach the carrier device 10 to the pane, which can be, for example, a polyurethane adhesive, has a uniform thickness.

Figure 5:
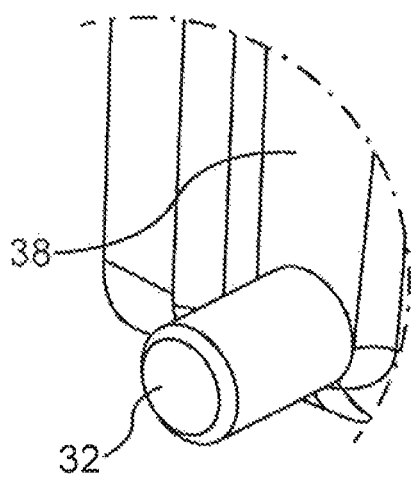
FIG. 5 in a perspective view, shows a first bolt which protrudes beyond a side wall of the housing of the cameras according to FIG. 1 and is to be secured to the carrier device in order to attach the housing of the cameras to the carrier device.
Figure 9:
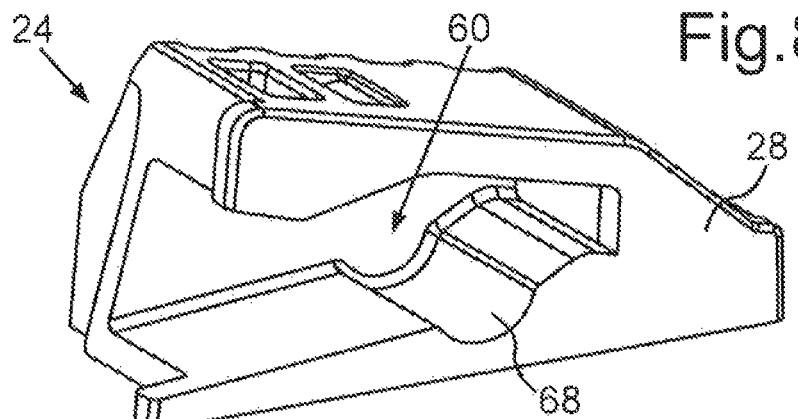
FIG. 9 in a perspective view, shows a corresponding base body of an additional holding element, which is constructed in an analogous manner, for fixing the second bolt.

FIG. 5 shows the first bolt 32 protruding beyond the left wall 38 of the housing 18 in a perspective view. The first bolt 32 is round in its cross-section and has a smooth surface so that it can be inserted particularly easily into a corresponding insertion region 60 of the associated holding element 24 (see FIG. 9).

Figure 6:
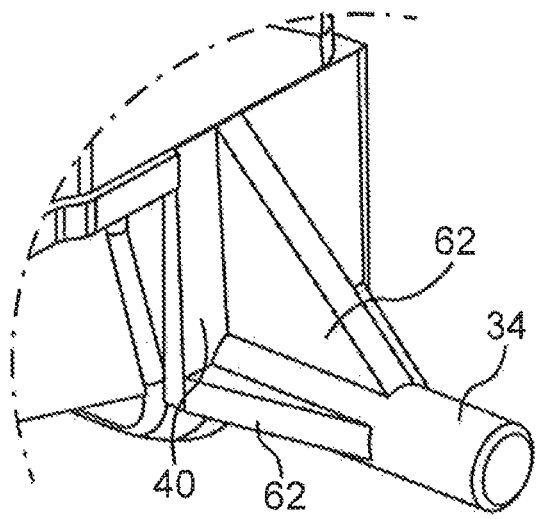
FIG. 6 in a perspective view, shows a second bolt protruding beyond a side wall of the housing of the cameras for the attachment of the housing to the carrier device.
Figure 8:
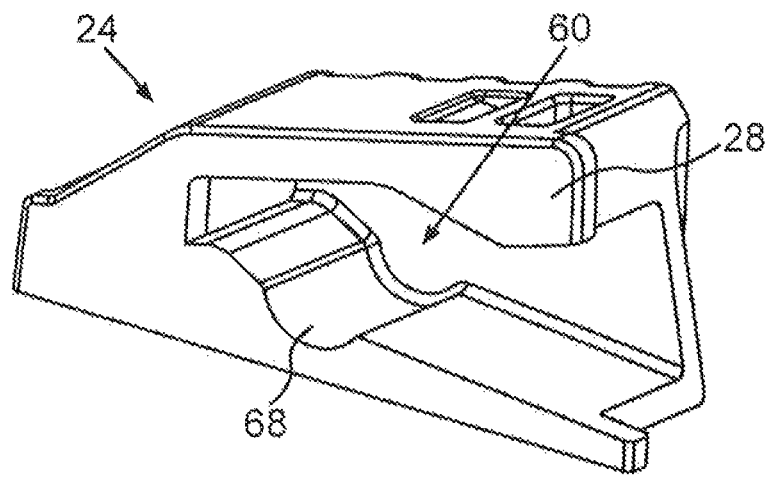
FIG. 8 in a perspective view, shows a base body of a holding element provided on the base plate of the carrier device to fix the first bolt.

In an analogous manner, FIG. 6 shows the second bolt 34 which protrudes beyond the right wall 40 and which is also round in its cross-section in an end region. The second bolt 34 is slightly longer than the first bolt 32, and supporting ribs 62 are provided on the second bolt 34 to give it increased stability. Due to the smooth surface, the round end region of the bolt 34 can be easily inserted into the corresponding insertion region 60 of the allocated holding element 24 (see FIG. 8). The bolts 32, 34, 36 can have a diameter of, for example, approximately 5 mm. A length of the first bolt 32 can be approximately 6.5 mm.

Figure 7:
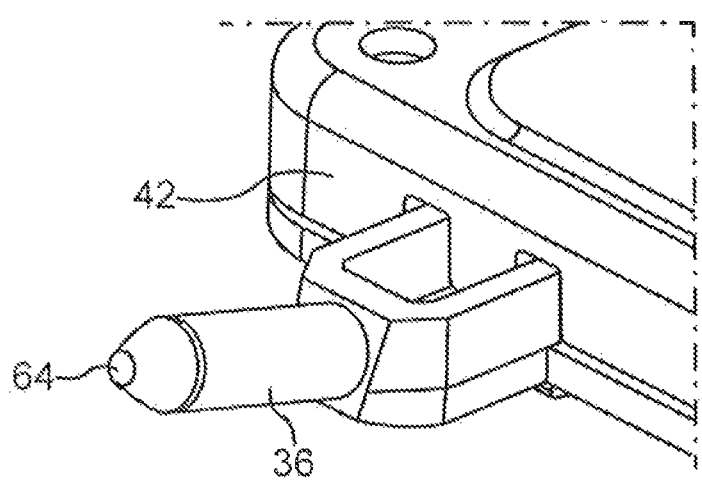
FIG. 7 in a perspective view, shows a third bolt which is used to attach the housing of the cameras to the carrier device and protrudes beyond a front-side wall of the housing of the cameras in a mounting direction.
Figure 10:
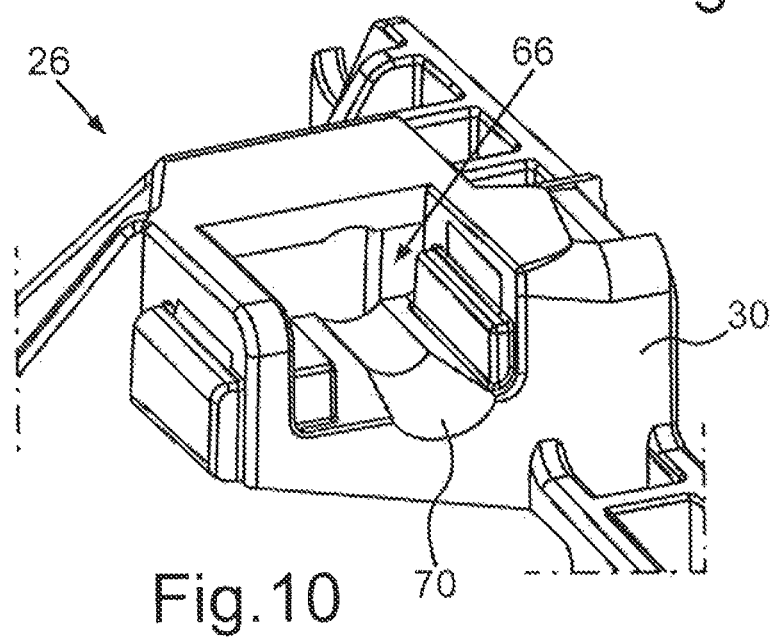
FIG. 10 in a perspective view, shows a corresponding base body of an additional holding element for fixing the third bolt.

The third bolt 36 which protrudes beyond the front-side wall 42 of the housing 18 (see FIG. 7) tapers to a tip 64 so that it can be inserted more easily into a corresponding receiving region 66 of the allocated holding element 26 (see FIG. 10). The third bolt 36 can have a length of approximately 18 mm.

In the insertion region 60 of the holding elements 24 provided for the first bolt 32 and the second bolt 34, respective locking recesses 68 are provided in which the bolts 32, 34 are positively received in regions when the housing 18 is attached to the carrier device 10. In the present case, the locking recesses 68 are semi-circular in the longitudinal section.

In order to attach the housing 18 to the carrier device 10, the housing 18 is mounted in parallel to the base plate 12 in a mounting direction, wherein the mounting direction is shown by the arrow 44 in FIG. 1. Correspondingly, the front third bolt 36 is pushed into the receiving region 66 in the mounting direction, the receiving region being formed in the third holding element 26 (see FIG. 10). In order to facilitate the insertion of the third bolt 36 into the corresponding third holding element 26, a depression 70 is formed in a base region of the base body 30 of the third holding element 26, the depression expanding in the present case in a first region as seen in the mounting direction.

Figure 11:
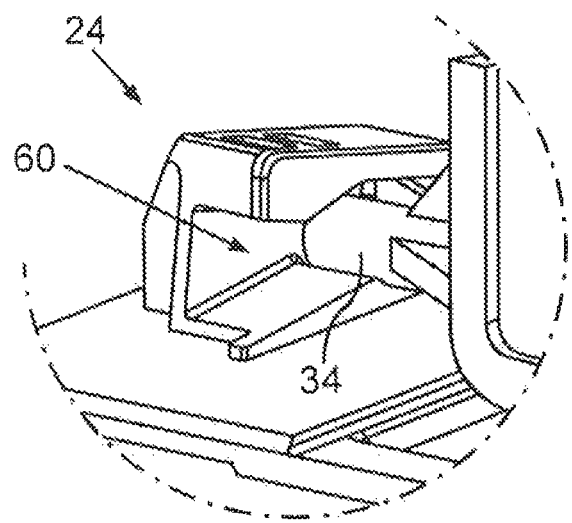
FIG. 11 in a perspective view, shows the second bolt fixed to the corresponding holding element.

FIG. 11 shows how the second bolt 34 is inserted into the insertion region 60 in the mounting direction and is received in the locking recess 68 of the corresponding holding element 24.

Figure 12:
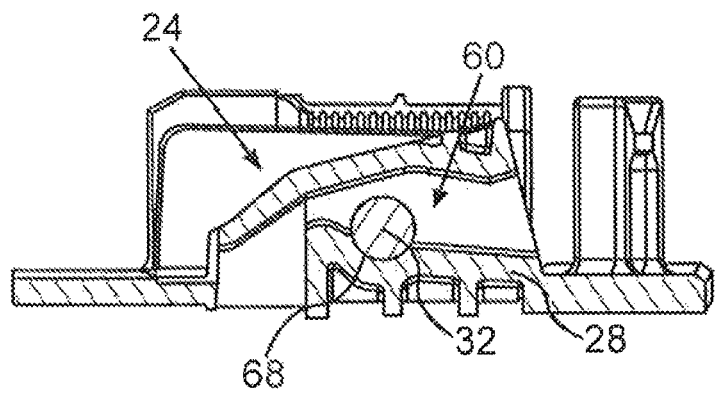
FIG. 12 in a sectional view along a line XII-XII in FIG. 1, shows the first bolt secured to the corresponding holding element.

It is particularly clear from the sectional view in FIG. 12 how the first bolt 32 is received in the associated locking recess 68, which is formed in the base body 28 of the corresponding holding element 24.

Figure 13:
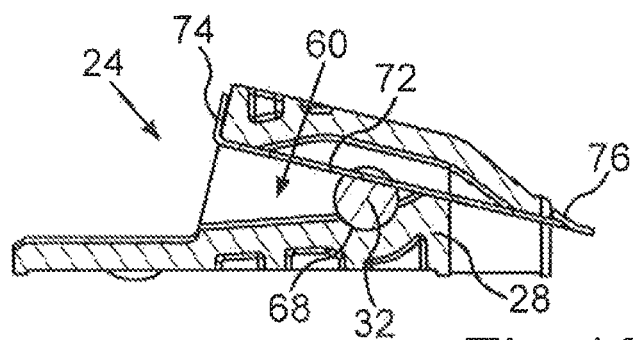
FIG. 13 in a sectional view, shows the holding element fixing the second bolt, wherein a spring is additionally shown which applies pressure to the second bolt acting in the direction of the pane.

It is particularly clear from FIG. 13 how the bolts 34, 32 which are fixed in the holding elements 24 are each applied with pressure acting in the direction towards the base plate 12 when they are received in the locking recesses 68. For this purpose, a substantially flat (in the unloaded state) spring 72 is attached to each base body 28 of the two holding elements 24 which applies pressure to the respective bolts 32, 34. The springs 72 are formed of a metal and can be, for example, approximately 30 mm long and approximately 5 mm wide. The depiction of the spring in FIG. 13 (as also in FIGS. 24, 27 and 28) is only to be understood schematically since the spring rests on the bolt in a curved manner in direct connection with the respective bolt 32, 34 since the spring exerts a force on it in the direction of the base plate.

An angled leg 74 or edge of the spring 72 which is in contact with the base body 28 of the holding element 24 can, for example, be 3 mm long. The spring 72 furthermore preferably has a loss prevention device in the form of a tab 76 formed in the manner of an undercut. The tab 76 can be brought into contact with a region of the base body 28 which is opposite the leg 74. The tab 76 then serves as a securing element which ensures that the spring 72 remains in the insertion region 60 of the holding element 24.

Figure 14:
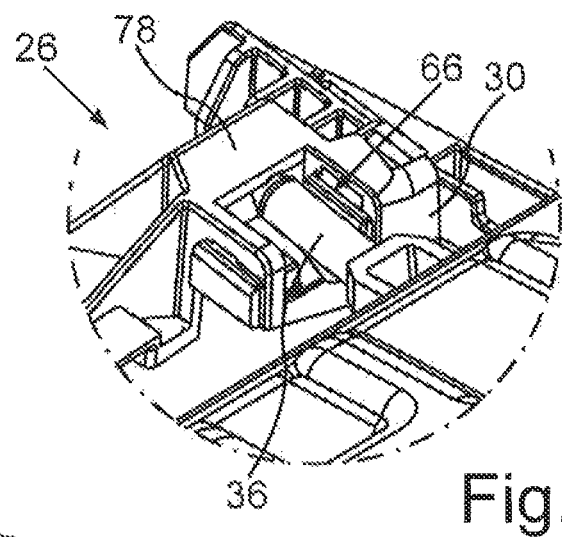
FIG. 14 in a perspective view, shows the third bolt received in the corresponding holding element.
Figure 15:
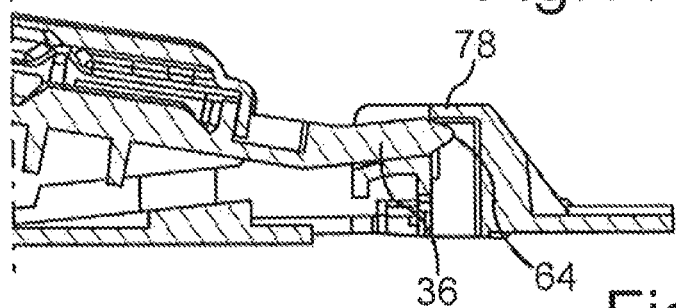
FIG. 15 shows the third bolt fixed to the third holding element in a sectional view along a line XV-XV in FIG. 1.

It is particularly clear from FIG. 14 how the third bolt 36 which protrudes slightly obliquely upwards from the base plate 12 (see FIG. 7) is arranged in the associated receiving region 66 of the third holding element 26. For this purpose, a roof 78 is formed in a rear end region of the base body 30 in the insertion direction, below which roof the tip 64 of the bolt 36 is located (see FIG. 15). The slightly oblique alignment of the third bolt 36 ensures that the tip 64 presses against the roof 78 from below.

Figure 16:
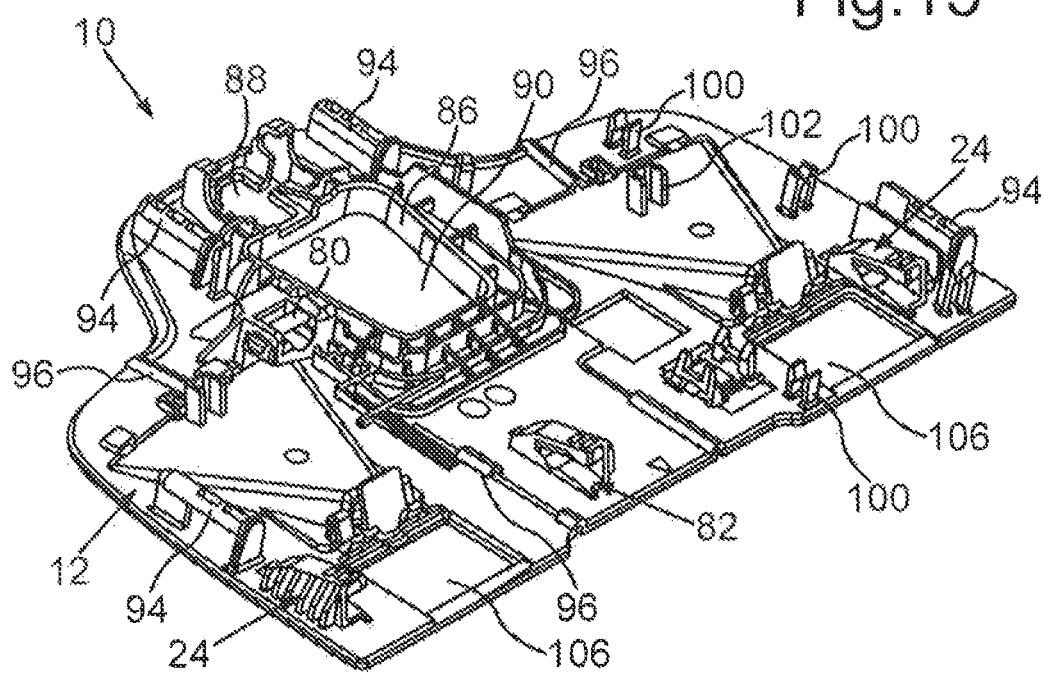
FIG. 16 in a perspective view, shows the carrier device according to FIG. 3.

Furthermore, a spring 80 arranged on the base body 30 of the third holding element 26 applies pressure to the bolt 36 towards the pane of the motor vehicle (see FIG. 1 and FIG. 16). The spring 80 allocated to the third holding element 26 is preferably formed to have the same form, dimensions and material as the springs 72 allocated to the other two holding elements 24.

The arrangement of the two holding elements 24 provided at the side of the receiving region for the housing 18 and the arrangement of the third holding element 26 on the base plate 12 are particularly evident from the perspective view in FIG. 16. It can furthermore be seen from FIG. 16 that an additional holding element 82 is arranged between these two lateral holding elements 24 which is formed analogously to the right holding element 24 in FIG. 16. A housing 84 of a camera, which contains only one camera and is therefore designed as a mono camera (see FIG. 19), can be attached to the carrier device 10 shown in FIG. 16 by means of the holding elements 24, 82, 26. Here too, the two holding elements 24, 82 are then arranged on the sides of the receiving region allocated to the housing 84 which run in parallel to the longitudinal side of the motor vehicle.

In particular, FIG. 16 shows further components of the carrier device 10. A frame 86 is thus formed as one piece with the base plate 12, the frame being used for the attachment of a rain and light sensor. When viewed in the forward travel direction, the carrier device 10 has a recess 88 in front of this frame 86, the recess being provided for the attachment of a mist sensor allocated to the rain and light sensor. If the carrier device 10 is not equipped with the rain and light sensor, a region 90 enclosed by the frame 86 (see FIG. 16) remains closed by a cover element in the form of a blind cap 92 (see FIG. 1). The blind cap 92 can, in particular, be formed in such a way that it can be released from the base plate 12 by breaking it out of the carrier device 10.

Furthermore, four attachment bolts 94 are arranged on the base plate 12, the bolts preferably being formed as one piece with the base plate 12. The attachment bolts 94 are used for the attachment of a cover cap (not shown) of the carrier device 10, by means of which the base plate 12 is covered up with respect to the passenger compartment. The cover cap (not shown) can be moved along the attachment bolts 94 in the longitudinal direction of the vehicle, such that installation tolerances of the pane and of the roof liner as well as adhesive tolerances of the carrier device 10 relative to the pane can be compensated for. In this case, provision can be made for the cover cap to be moved by 3 mm from a central position, for example, forwards towards the vehicle front or backwards towards the vehicle rear.

Furthermore, a series of expansion joints 96 is provided in the carrier device 10 which serve to relieve tensions arising as a result of heat exposure. An arrow 98 which is arranged on the base plate 12 (see FIG. 1) indicates the center of the motor vehicle referred to with Y0 in the transverse direction and allows the carrier device 10 to be correctly positioned on the pane in relation to this center point.

In particular, it is clear from FIG. 16 that several cable clips 100 are preferably arranged on the base plate 12 which facilitate the laying of cables, for example for the power supply of the rain and light sensor. In the present case, stops 102 are arranged on the lens hoods 46, 48, one of which rests against the front-side wall 42 of the housing 18 when the housing 18 is mounted on the carrier device 10 (see FIG. 1). If the housing 84 of the mono camera is mounted on the carrier device 10, the other of the two stops 102 rests against this housing 84 on the front side. The stops 102 thus make it possible to determine whether the respective housing 18, 84 has reached its installation position in the respective receiving region, in which it is held by three holding elements 24, 26, 82, respectively.

Figure 17:
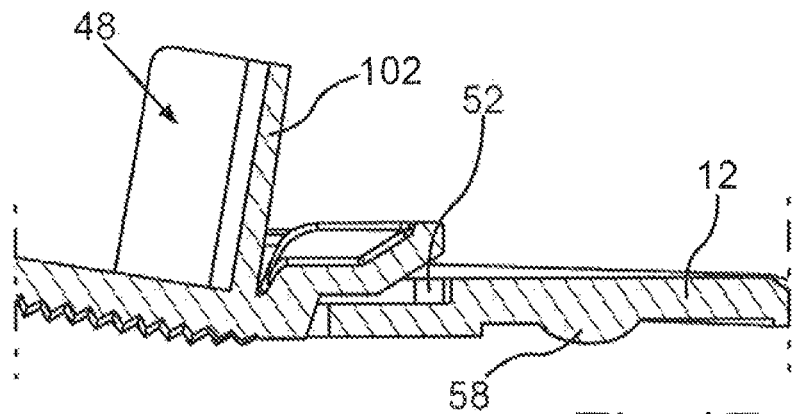
FIG. 17 shows a sectional view along a line XVII-XVII in FIG. 1.

It is particularly clear from the sectional view in FIG. 17 how the lens hood 48 is arranged on the base plate 12 of the carrier device 10.

In particular, it is furthermore clear from FIG. 2 that the housing 18 can have incisions 104 which, compared to a consistently rectangular shape of the housing 18, require less installation space for the housing 18. For example, an interior rear view mirror and the rain and light sensor can thus be attached more easily to the carrier device 10 by means of these incisions 104. Furthermore, the housing 18 of the camera preferably has sections which allow the solder distributor or such a distribution device as well as the holding element 82 to be accommodated below the housing 18 in a simpler manner.

Recesses 106 are preferably provided in the base plate 12, on which condensation water may collect (see FIG. 16). This prevents misting of a lens of the respective camera which is accommodated in the housing 18, 84. Furthermore, an overflow channel for receiving excess adhesive is preferably present in the base plate 12.

Figure 18:
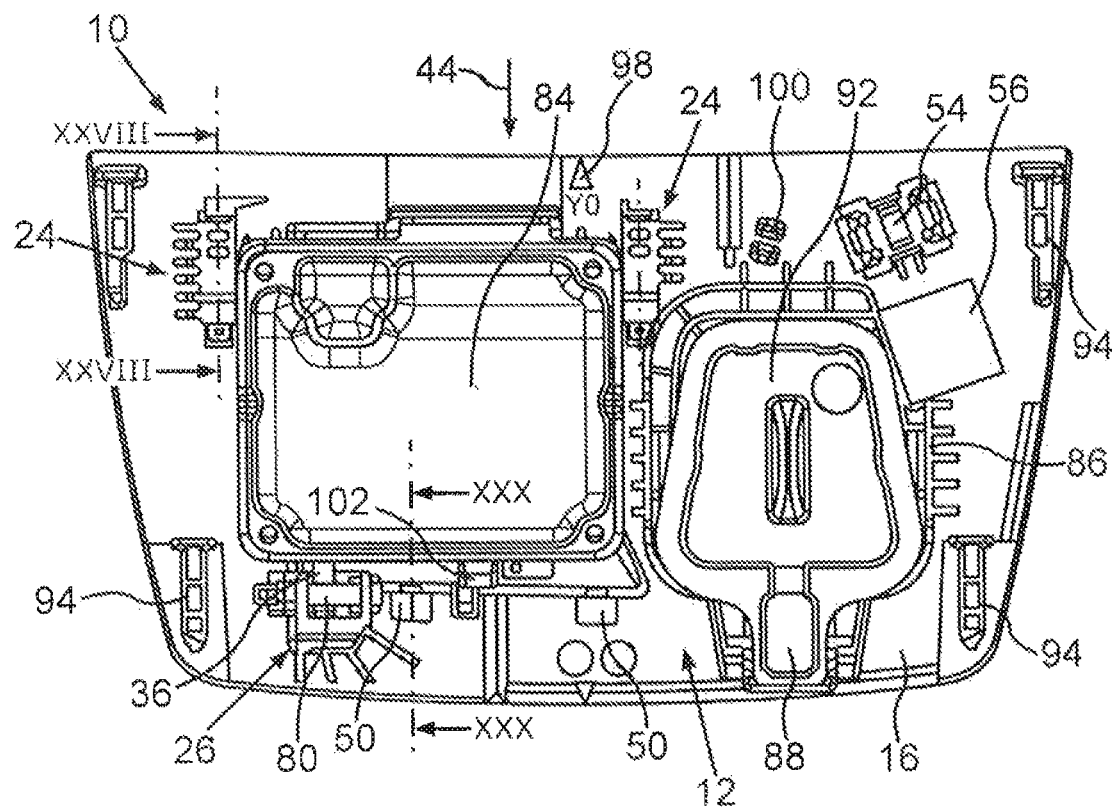
FIG. 18 in a top view, shows an additional carrier device, on which a housing with only one camera is secured.
Figure 19:
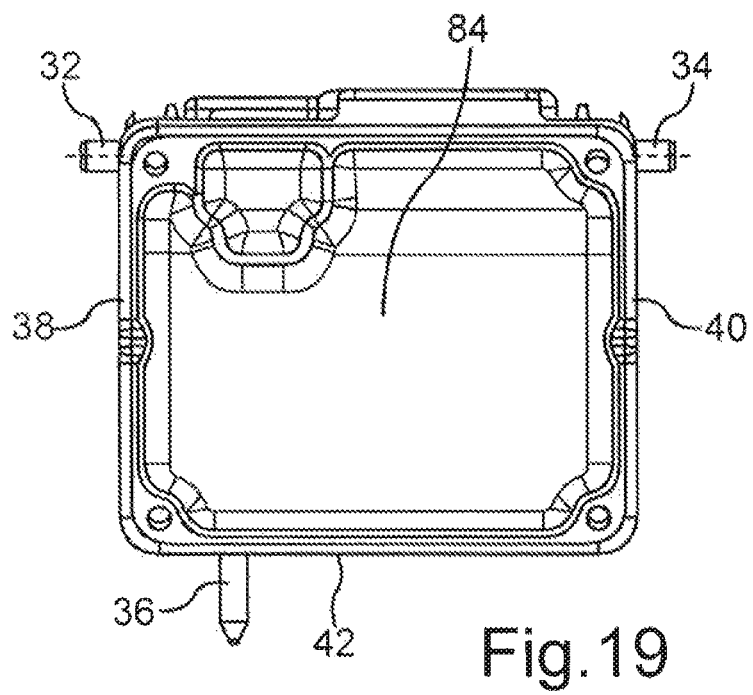
FIG. 19 in a top view, shows the housing of the camera held on the carrier device according to FIG. 18.

The camera accommodated in the housing 84 shown in FIG. 19 can indeed be arranged on the carrier device 10 shown in FIG. 1, however, FIG. 18 shows a carrier device 10 which can also be used for securing the housing 84. The two base bodies 28 of the holding elements 24, which are arranged in parallel to longitudinal sides of the motor vehicle and which are located at the side of the receiving region provided for the housing 84, are preferably formed as one piece with the base plate 12.

In an analogous manner, the third holding element 26 is used to secure the front-side third bolt 36 which protrudes beyond the front-side wall 42 of the housing 84 (see FIG. 19). In this case too, the spring 80 shown in FIG. 18 is used to apply pressure to the third bolt 36, the pressure acting in the direction towards the base plate 12.

Furthermore, the springs 72 provided on the base bodies 28 of the two other holding elements 24 ensure that the first bolt 32 and the second bolt 34 are also applied with pressure acting in this direction.

FIG. 19 shows the housing 84 with the three bolts 32, 34, 36 arranged on respectively different sides thereof and protruding beyond the walls 38, 40, 42.

Figure 20:
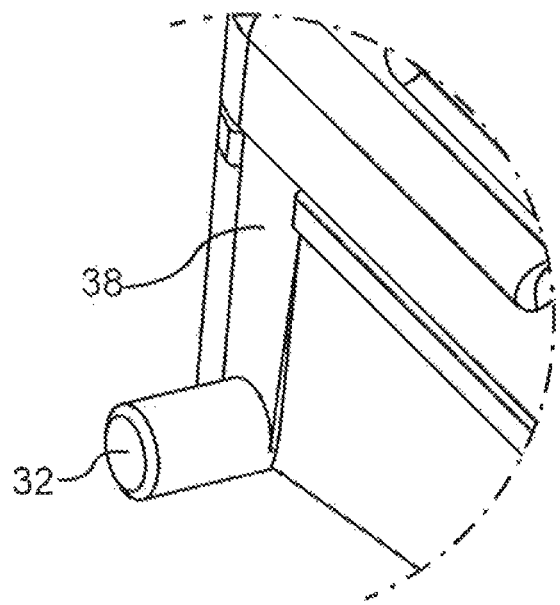
FIG. 20 in a perspective view, shows a first bolt which protrudes beyond a lateral wall of the housing according to FIG. 19.

In FIG. 20, the first bolt 32 is shown in an enlarged, perspective detailed view.

Figure 21:
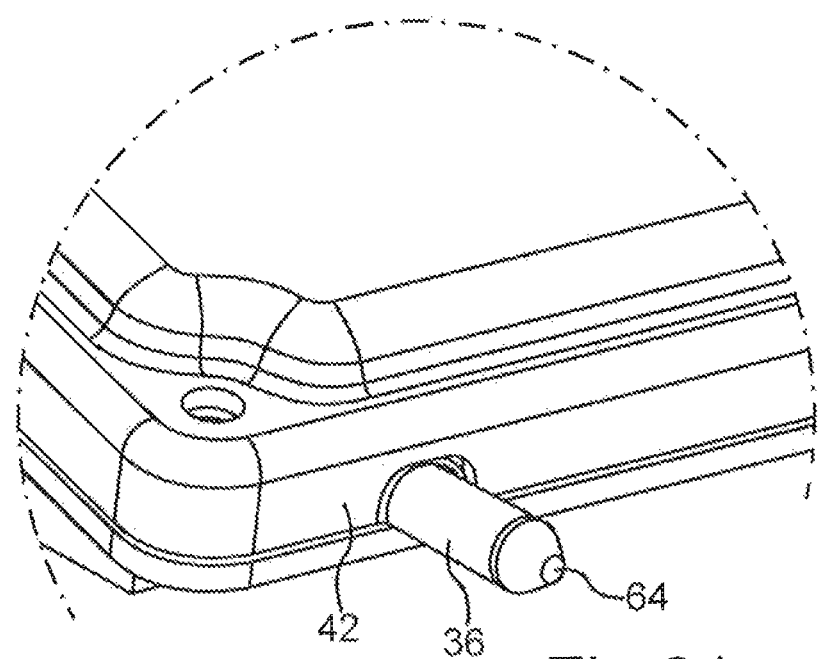
FIG. 21 in a perspective view, shows a third bolt protruding beyond a front-side wall of the housing, in a mounting direction according to FIG. 19.

FIG. 21 shows a perspective view of the third bolt 36 which protrudes beyond the front-side wall 42 and which has the conically tapered tip 64.

Figure 22:
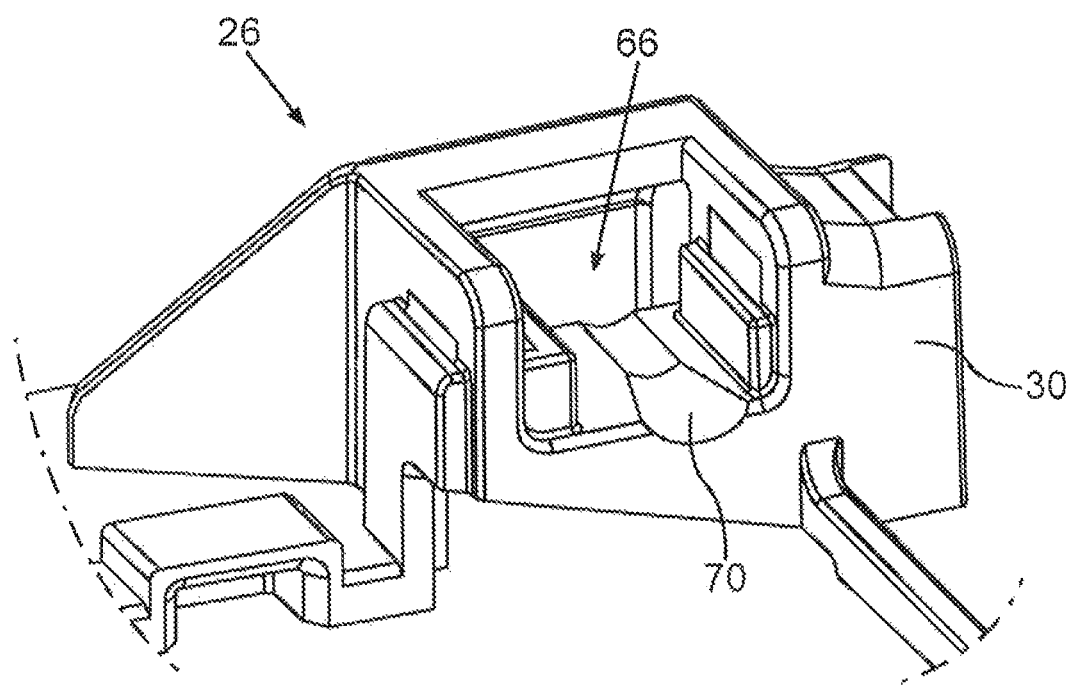
FIG. 22 in a perspective view, shows a holding element which is allocated to the third bolt shown in FIG. 21 and is arranged on a base plate of the carrier device according to FIG. 18.

FIG. 22 shows a perspective view of the base body 30 of the third holding element 26 which is allocated to the third bolt 36. Here too, the depression 70 in which the third bolt 36 is received when it is inserted into the receiving region 66 is provided in the base region of the base body 30.

Figure 23:
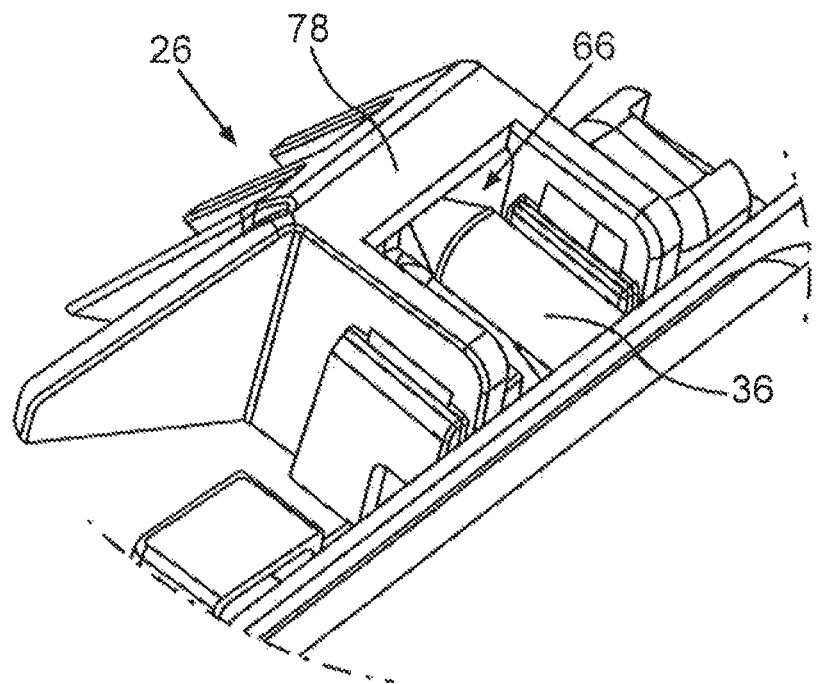
FIG. 23 in a perspective view, shows the third bolt according to FIG. 21 secured to the holding element according to FIG. 22.

FIG. 23 shows the third bolt 36 inserted into the receiving region 66 of the third holding element 26, wherein the tip 64 is arranged below the roof 78.

Figure 24:
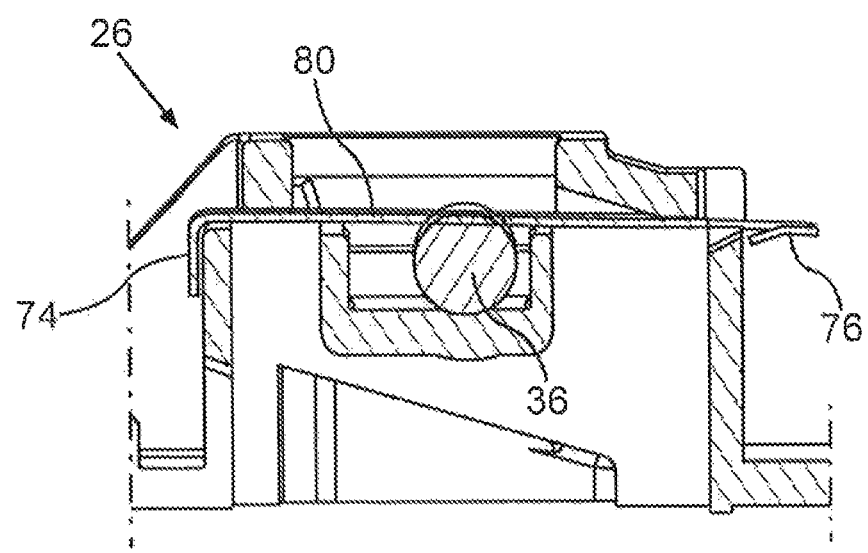
FIG. 24 in a sectional view, shows the bolt secured to the holding element according to FIG. 23, wherein a spring which applies pressure to the bolt acting in the direction of the pane is also shown.

It is clear from the sectional view of the third holding element 26 shown in FIG. 24 how the spring 80 applies pressure to the third bolt 36.

Figure 25:
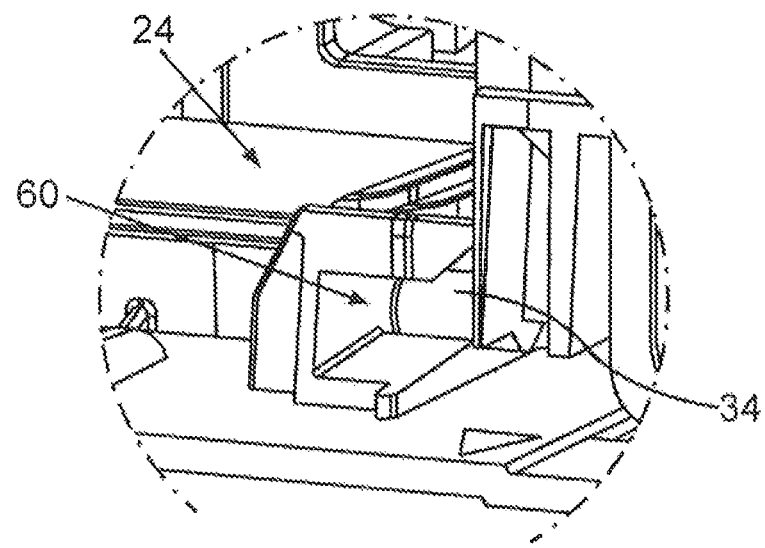
FIG. 25 shows the first bolt of the housing of the camera secured to the corresponding holding element according to FIG. 19.

FIG. 25 shows a perspective view of the second bolt 34 of the housing 84 inserted into the insertion region 60 of the holding element 24.

Figure 26:
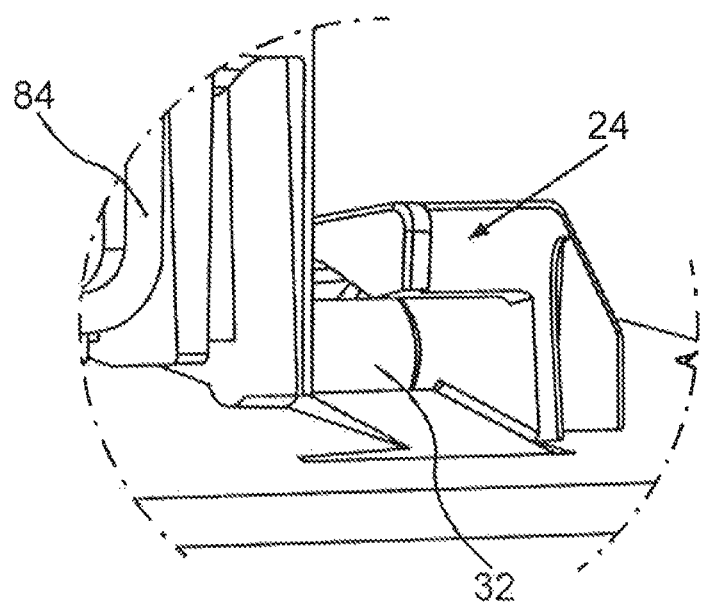
FIG. 26 Shows the second bolt of the housing of the camera secured in the corresponding holding element according to FIG. 19.

FIG. 26 shows a perspective view of the first bolt 32 received in the second of the two identically formed holding elements 24.

Figure 27:
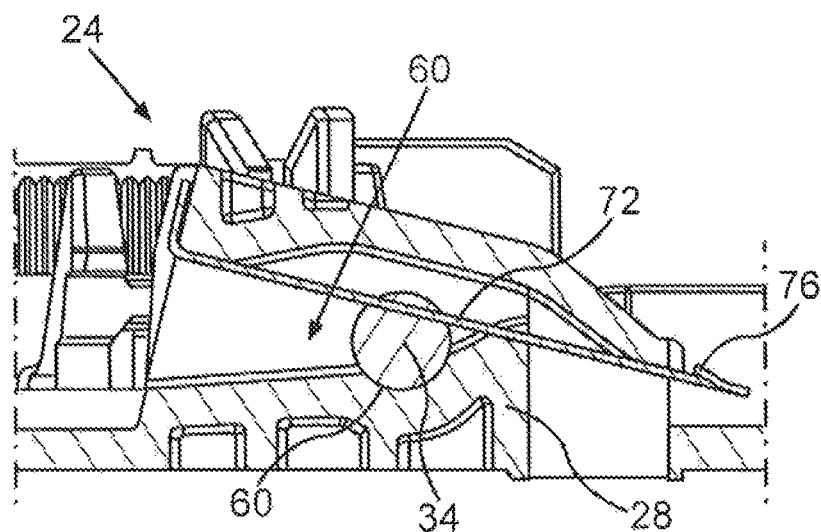
FIG. 27 in a sectional view, shows the second bolt received in the corresponding holding element.

From the sectional view through the second holding element 24 allocated to the second bolt 34 depicted in FIG. 27, the spring 72 which applies pressure to this second bolt 34 is particularly clear.

Figure 28:
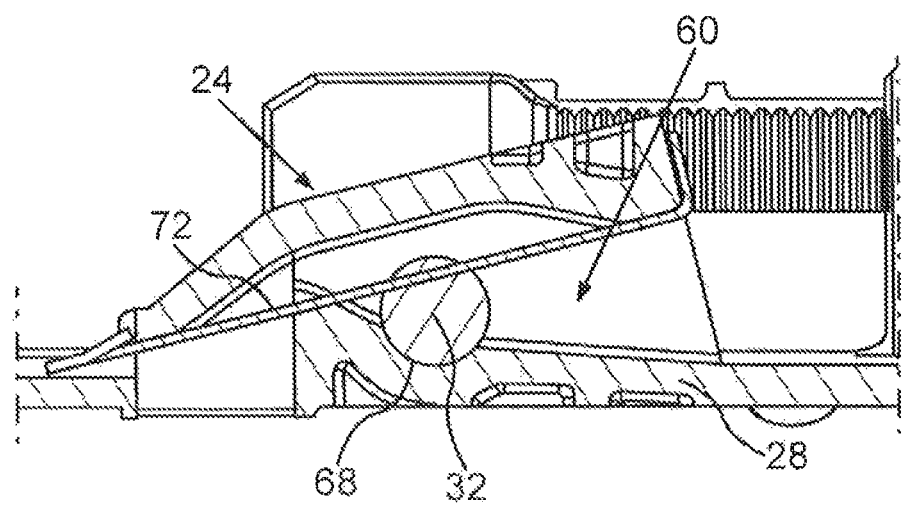
FIG. 28 in a sectional view along a line XXVIII-XXVIII in FIG. 18, shows the first bolt held in the corresponding holding element.

In an analogous manner, the sectional view in FIG. 28 illustrates the application of the pressure exerted by the spring 72 to the first bolt 32.

Figure 29:
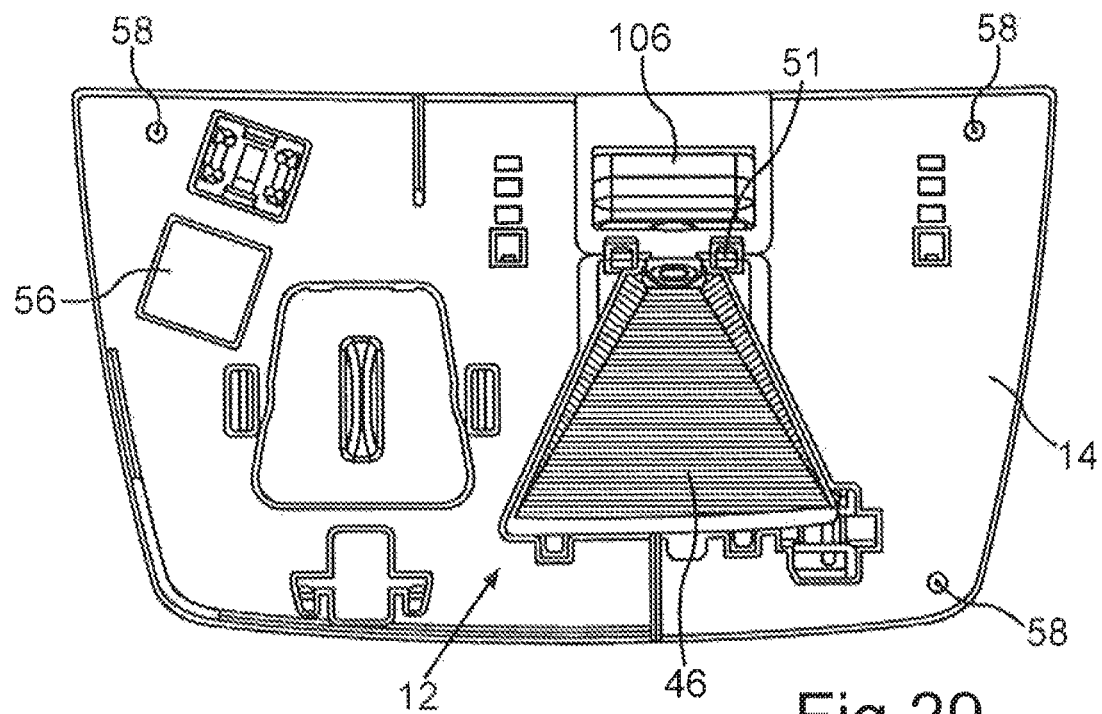
FIG. 29 shows the carrier device according to FIG. 18 in a top view of the side facing towards the pane.

From the view depicted in FIG. 29 of the first side 14 of the base plate 12 facing towards the pane, it is clear that spacers 58 are also provided in this carrier device 10. Furthermore, the lens hood 46 is shown clipped into the base plate 12. In addition, the recess 56 and the recess 106 are clearly visible in FIG. 29.

Figure 30:
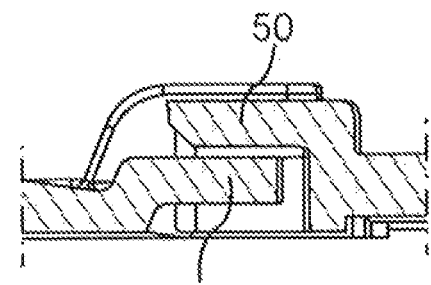
FIG. 30 sectionally, shows a sectional view of the carrier device along a line XXX-XXX in FIG. 18.

Furthermore, FIG. 30 shows how an extension 108 of the lens hood 46 in the region of one of the front holding tabs 50 in the direction of the arrow 44 ensures the detachable connection of the lens hood 46 to the base plate 12. Here, the extension 108 is introduced into the holding tab 50.

Figure 31:
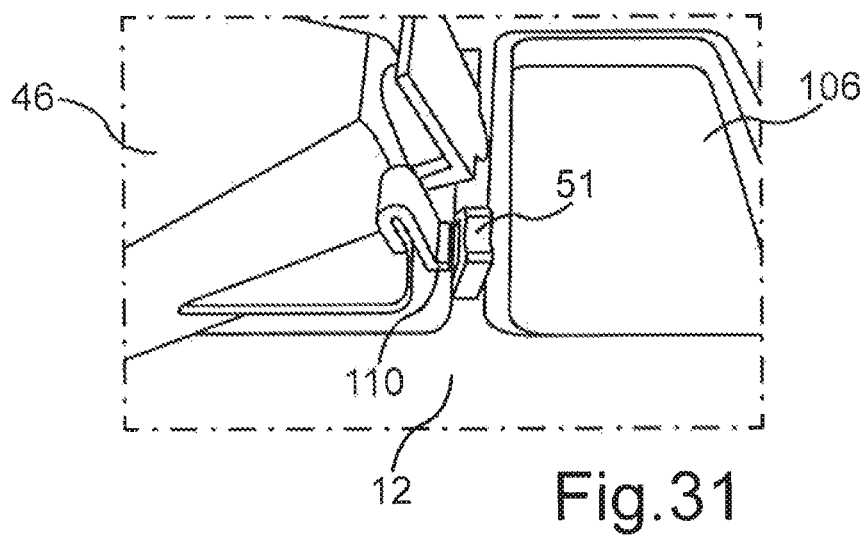
FIG. 31 sectionally and perspectively, shows a lens hood prior to its final latching with a holding tab which is formed as one piece with the base plate of the carrier device according to FIG. 18.

Finally, FIG. 31 sectionally and perspectively shows the lens hood 46 before it is interlocked with one of the two rear holding tabs 51 which are arranged adjacent to the recess 106 provided in the base plate 12. From this depiction, it is clear that a latching hook 110 arranged on a base body of the lens hood 46 can be brought into engagement with the holding tab 51 by pivoting the lens hood 46 towards the base plate 12.

The invention claimed is:

1. A carrier device for attachment to a pane of a motor vehicle, comprising:
   a base plate which is securable on the pane; and
   a carrier arrangement formed on the base plate to hold a housing of a camera;
   wherein the carrier arrangement includes:
      at least one holding element, wherein a pressure is applyable directly by the at least one holding element to a rod-shaped component which is disposed on the housing and protrudes beyond a wall of the housing, wherein the pressure acts in a direction of the base plate, and wherein the at least one holding element has a base body; and
      a spring element, wherein the spring element is a separate component from the at least one holding element and the base body and is attached to the base body of the at least one holding element and wherein the spring element includes an angled leg in contact with the base body and a securing element contactable with a region of the base body which is opposite the angled leg.

2. The carrier device according to claim 1, wherein the carrier arrangement includes three holding elements which are disposed on respectively different sides of a receiving region of the carrier device provided for the housing of the camera.

3. The carrier device according to claim 2, wherein two of the three holding elements are disposed on sides of the receiving region which run at least substantially parallel to longitudinal sides of the motor vehicle in relation to a positioning of the carrier device on the pane of the motor vehicle.

4. The carrier device according to claim 3, wherein the two holding elements each have one insertion region leading to respective locking recesses for the respective rod-shaped component by means of which a mounting direction for the housing of the camera running at least substantially parallel to the base plate is specified.

5. The carrier device according to claim 4, wherein the mounting direction points in a forward travel direction of the motor vehicle with respect to the positioning of the carrier device on the pane of the motor vehicle, wherein the respective insertion regions of the two holding elements are formed to open against the mounting direction in a U shape or V shape.

6. The carrier device according to claim 3, wherein a third of the three holding elements is arranged on a side of the receiving region which is closer to a vehicle front than to a vehicle rear with respect to the positioning of the carrier device on the pane of the motor vehicle.

7. The carrier device according to claim 6, wherein a height of the third holding element and/or a height of at least one spacer arranged on a side of the base plate which faces towards the pane of the motor vehicle in an installation position of the carrier device depends on an inclination of the pane of the motor vehicle and a detection region of the camera.

8. The carrier device according to claim 1, wherein the spring element is formed from a metal.

9. A pane of a motor vehicle in combination with a carrier device according to claim 1 and the camera, wherein the carrier device is positioned on the pane, wherein the housing of the camera is secured by the carrier arrangement of the carrier device such that surroundings of the motor vehicle are recordable at least in regions by the camera.

* * * * *